United States Patent
Kropac et al.

(10) Patent No.: US 9,010,982 B2
(45) Date of Patent: Apr. 21, 2015

(54) LIGHT GUIDE MODULE WITH ADJUSTABLE CONTOUR SURFACE ILLUMINATION

(75) Inventors: Miroslav Kropac, Ostrava-Vyšovice (CZ); Petr Mrklovsky, Novy Jičin (CZ); Libor Juttner, Suchdol nad odrou (CZ); Thomas Nejezchleba, Novy Jičin (CZ)

(73) Assignee: Varroc Lighting Systems S.R.O. (CZ)

( * ) Notice: Subject to any disclaimer, the term of this patent is extended or adjusted under 35 U.S.C. 154(b) by 34 days.

(21) Appl. No.: 13/286,306

(22) Filed: Nov. 1, 2011

(65) Prior Publication Data
US 2012/0099310 A1    Apr. 26, 2012

(30) Foreign Application Priority Data

Jan. 11, 2010    (CZ) .................................. 2010-789

(51) Int. Cl.
*F21V 8/00*      (2006.01)
*F21V 5/04*      (2006.01)
*B60Q 3/00*      (2006.01)

(52) U.S. Cl.
CPC .............. *B60Q 3/004* (2013.01); *G02B 6/0018* (2013.01); *G02B 6/0028* (2013.01)

(58) Field of Classification Search
USPC ............ 362/615, 551, 555, 552, 511, 311.07, 362/311.02, 332, 333, 27–30; 385/45, 146, 385/91
See application file for complete search history.

(56) References Cited

U.S. PATENT DOCUMENTS

| | | | |
|---|---|---|---|
| 4,992,704 A * | 2/1991 | Stinson ......................... | 315/312 |
| 6,356,394 B1 * | 3/2002 | Glienicke ..................... | 359/641 |
| 7,142,769 B2 * | 11/2006 | Hsieh et al. ................... | 385/146 |
| 7,290,906 B2 | 11/2007 | Suzuki et al. | |
| 7,490,962 B2 * | 2/2009 | Liu et al. ...................... | 362/307 |
| 7,614,768 B2 | 11/2009 | Stanitzok et al. | |
| 7,703,973 B2 * | 4/2010 | Zhu et al. ...................... | 362/623 |
| 7,855,815 B2 * | 12/2010 | Hayashide et al. .......... | 358/484 |
| 2003/0128957 A1* | 7/2003 | Kalantar ....................... | 385/146 |
| 2003/0156417 A1* | 8/2003 | Gasquet et al. ............... | 362/329 |
| 2007/0159831 A1* | 7/2007 | Faller ............................. | 362/311 |

(Continued)

FOREIGN PATENT DOCUMENTS

| EP | 1083090 A2 | 3/2001 |
|---|---|---|
| JP | 59-8846 | 1/1984 |
| JP | S59008846 U | 1/1984 |

(Continued)

OTHER PUBLICATIONS

Light Guide Techniques, Avago Technologies, Dec. 11, 2006.*

(Continued)

*Primary Examiner* — Evan Dzierzynski
*Assistant Examiner* — Naomi M Wolford
(74) *Attorney, Agent, or Firm* — Cantor Colburn LLP

(57) ABSTRACT

A light guide module with adjustable lighting of a contour surface is composed of light sources and a light guide. The light guide is composed of a primary part, a Y-shaped branch, and a secondary part with a contour surface. The supporting surface of the Y-shaped branch of the light guide is composed of a system of directional optical elements, is of prismatic shape, conical shape, or a combination thereof, and has a vertex on the optical axis of the primary part of the light guide.

17 Claims, 4 Drawing Sheets

(56) References Cited

U.S. PATENT DOCUMENTS

| | | |
|---|---|---|
| 2011/0006294 A1 | 1/2011 | Tanaka et al. |
| 2012/0026748 A1* | 2/2012 | Boonekamp et al. ......... 362/551 |

FOREIGN PATENT DOCUMENTS

| | | |
|---|---|---|
| JP | 2003297109 A | 10/2003 |
| JP | 2005158362 A | 6/2005 |
| JP | 2008518411 A | 5/2008 |
| JP | 20090054593 | 3/2009 |

OTHER PUBLICATIONS

Office Action re corresponding JP Case No. 2011-240442; dated Mar. 25, 2013; 2 pgs.

* cited by examiner

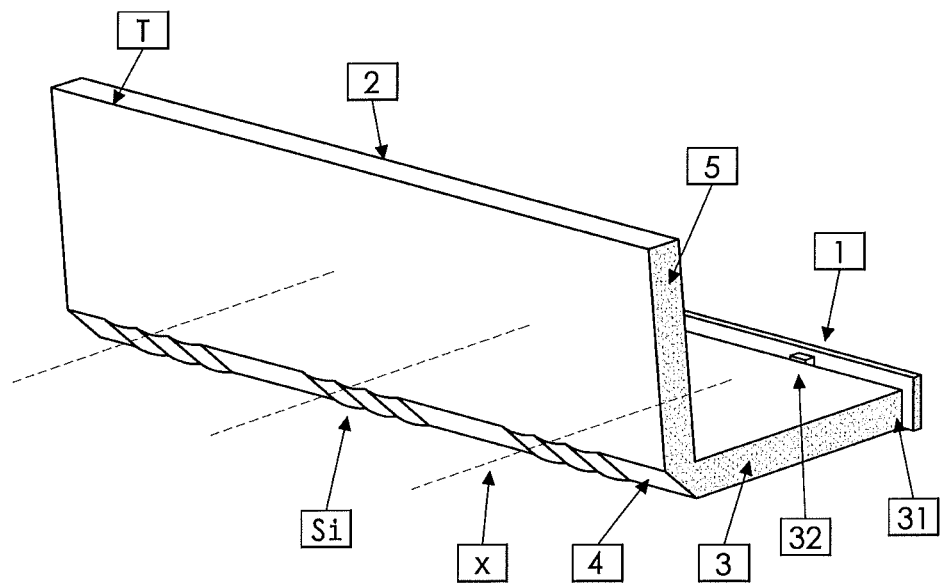
Fig. 3
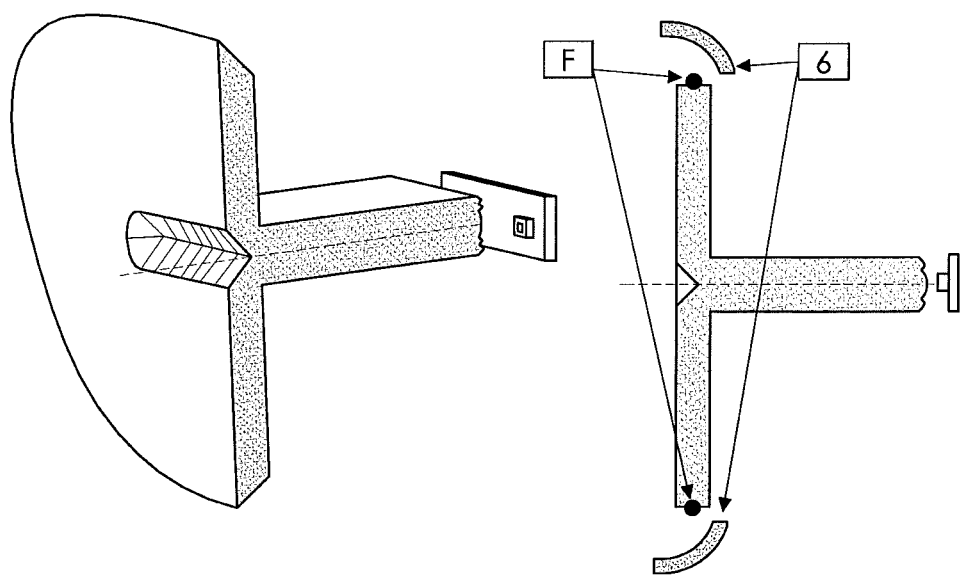
Fig. 4  Fig. 5

LIGHT GUIDE MODULE WITH ADJUSTABLE CONTOUR SURFACE ILLUMINATION

CROSS-REFERENCE TO RELATED APPLICATION

This application claims the benefit of priority of Czech Republic Patent Application No PV. 2010-789 filed on Nov. 1, 2010 hereby incorporated herein by reference in its entirety.

FIELD OF THE INVENTION

This invention relates to the construction of interior and exterior signal lighting in vehicles and more particularly to a light guide module with adjustable lighting of a contour surface including light sources and a light guide.

BACKGROUND OF THE INVENTION

The uniformity of lighting of dashboards or other interior parts is usually a critical parameter in the area of interior signal lighting. Because front and rear contour lights, directional indicator lights, and daytime running lights are used to accentuate the exterior style features of a vehicle, requirements for homogeneity are also becoming essential for exterior signal lighting. For these purposes, light guide components with light-emitting diodes (LEDs) are commonly used as a light source.

Light guide components, constructed according to the required appearance, can have a linear base or a planar base.

A linear light guide component can be added to one side or both sides in the direction of the light guide axis, i.e., usually perpendicular to the lighting direction. The drawback to this approach is that it cannot be used on a complicated contour shape with relatively small diameters.

A planar light guide component is ordinarily provided with several LEDs and an axis that coincides with the lighting direction. In order to attain the required homogeneity of the emerging beam, it is possible to use collimating optical elements on the input surface or properly constructed optical elements on the exit surface. The drawback of this approach is the large number of LEDs arranged along the entire input surface.

It would be desirable to have a light guide module that can achieve a required lighting using totally uniform lighting of the contour surface.

SUMMARY OF THE INVENTION

Consonant with the present invention, a light guide module that can achieve a required lighting using totally uniform lighting of the contour surface, has surprisingly been discovered.

In an embodiment of the invention, the light guide module with adjustable lighting of the contour surface is composed of light sources and a light guide. The light guide is composed of a primary part, a Y-shaped branch, and a secondary part with contour surface. The supporting surface of the Y-shaped branch of the light guide is composed of a system of directional optical elements, is of prismatic shape, conical shape, or a combination of these, and has its vertex on the optical axis of the primary part of the light guide.

The light sources are light-emitting diodes (LEDs) placed behind the primary part of the light guide. The light-emitting diodes (LEDS) behind the primary part that terminates in a conically configured Y-shaped branching have a higher luminous flux than the light-emitting diodes (LEDs) behind the primary part that terminates in a prismatically configured Y-shaped branching.

The first edge of the light guide is provided with a collimating component.

The directional optical elements are formed by planar surfaces, cylindrical surfaces, or non-uniform rational base splines surfaces (NURBS), whose shape is defined by the shape of the entry region S and the incoming illumination F [lx] onto S, and the shape of the exit region T and the required outgoing illumination G [lx] onto T.

As is illustrated in FIG. 2, the regions S, T can be represented by curves $\phi(s)$, $\gamma(t)$, where s and t represent the natural parameters of the curves $\phi$, $\gamma$. The illuminations F, G in the regions of S, T can be subsequently replaced by the functions f(s), g(t) along the curves $\phi$, $\gamma$ according to the formulas:

$$f(s)\lim_{\varepsilon\to 0}\frac{1}{\varepsilon}\int_{S_\varepsilon}\int_{(s)}F\,dS$$

$$g(t)\lim_{\varepsilon\to 0}\frac{1}{\varepsilon}\int_{T_\varepsilon}\int_{(t)}G\,dT$$

where $S_\varepsilon(s)$, $T_\varepsilon(t)$ are areas in S, T around $\phi(s)$, $\gamma(t)$ with thickness s and width W. For the Y-shaped branching in t in the shape of a prism, the relationship $f(s)=F(\phi(s))W$, $g(t)=G(\gamma(t))W$ is obtained.

According to this notation, the region $S_i$, defined by the interval of parameters $[s_i, s_{i+1}]$ of curve $\phi$, corresponds to the region $T_i$, concerning the parameters $[t_i, t_{i+1}]$, $t_i=t(s_i)$, $t_{i+1}=t(s_{i+1})$ of curve $\gamma$ and $$\int_{s_i}^{s_{i+1}} f(s)e^{-\beta x(s,t)}\,ds = \int_{t_i}^{t_{i+1}} g(t)\,dt \qquad (Q1)$$

where $\beta$ is the absorption constant in the material, and x(s, t) is the distance between points $\phi(s)$, $\gamma(t(s))$.

Let $$B = \int_0^{L_\varphi} f(s)e^{-\beta x(s,t(s))}\,ds \bigg/ \int_0^{L_\gamma} g(t)\,dt$$

be defined as the coefficient of energy saturation. If B=1, as much energy as is needed is available from region S to region T. If B>1, there is a surplus of luminous energy in region T. If B<1, there is a deficit of luminous energy in region T. In such cases, one can work with a modified formula $\hat{g}(t)$=B g(t). It must be noted that B is a function of absorption in the material, since this is the function t(s). It is assumed hereinafter that B=1.

By rearranging (Q1), an equation is obtained for the desired function t=t(s)

$$f(s)e^{-\beta x(s,t)}=g(t)t' \qquad (Q2)$$

A general solution for (Q2), in the case of constant losses in the material, $e^{-\beta x(s,t)}=\omega(s)$ can be written in the form, $$\int g(t)\,dt = \int f(s)\omega(s)\,ds + C \qquad (Q3)$$

where the constant C is established by the choice of the starting point of the curve $\gamma$. Equations (Q2), (Q3), as well as the most general case, when B≠1, are usually solved for the unknown function t=t(s) by numerical and iterative methods.

The structure of the panels $S_i$, forming the Y-shaped branch of the light guide, which reflect only into the region $T_i$ in the contour region T, has a high sensitivity to fabrication inaccuracies and tolerances. To reduce this sensitivity, the faces $S_i$ are constructed as planar surfaces, cylindrical surfaces, or NURBS surfaces, which reflect the beams incident upon a region in region T containing the region $T_i$.

BRIEF DESCRIPTION OF THE DRAWINGS

The above, as well as other advantages of the present invention, will become readily apparent to those skilled in the art from the following detailed description when considered in the light of the accompanying drawings, in which:

FIG. 3 represents a section through a light guide module with a linear-shaped contour surface according to an embodiment of the invention;

FIG. 4 represents a modification of the orientation of the contour surface, which makes it possible to aim the light in the direction of the axis of the primary part of the light guide module according to another embodiment of the invention;

FIG. 5 represents an example of an optical system, where the light guide module is supported by a reflector according to further embodiment of the invention.

DETAILED DESCRIPTION OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
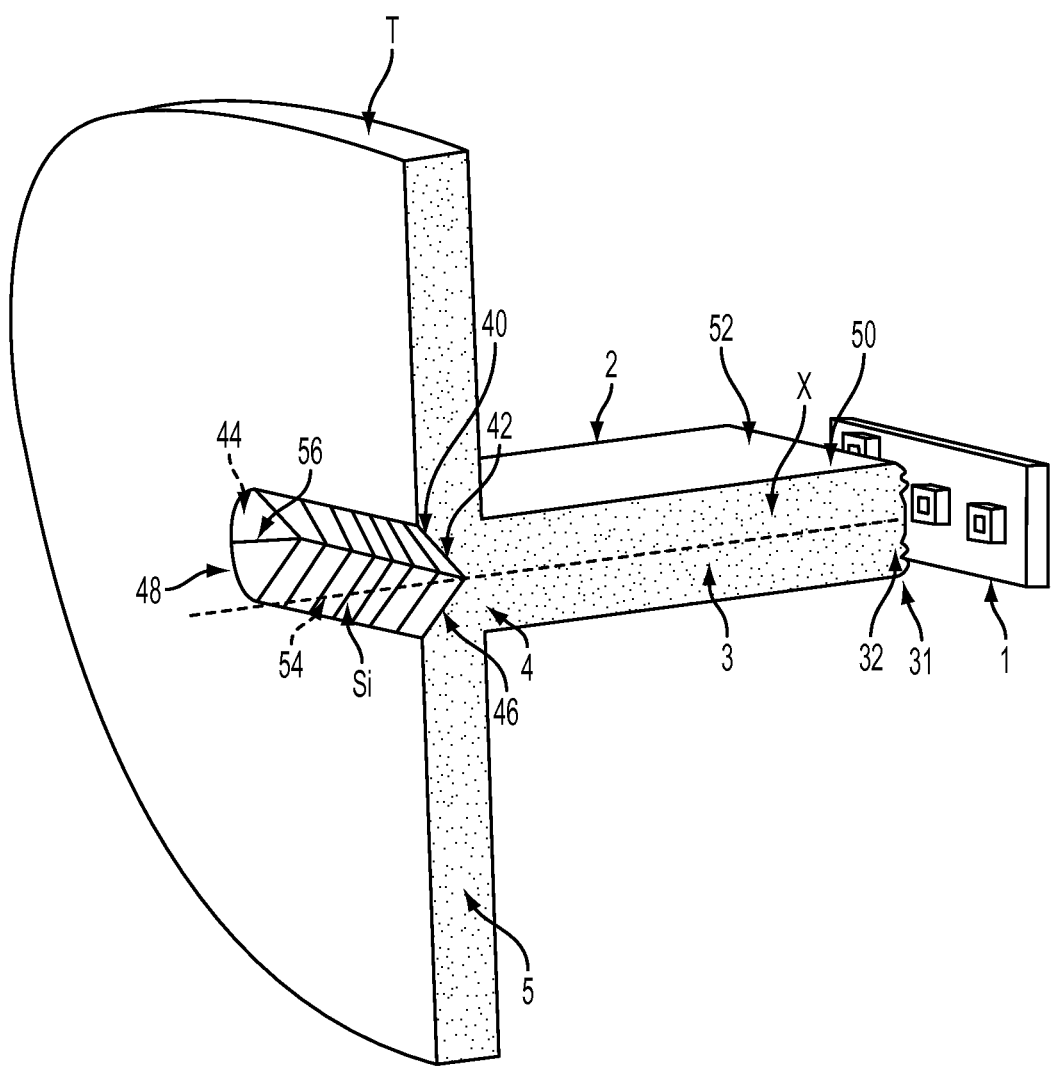
FIG. 1 represents a section through a module with an oval-shaped contour surface according to an embodiment of the invention.
Figure 2:
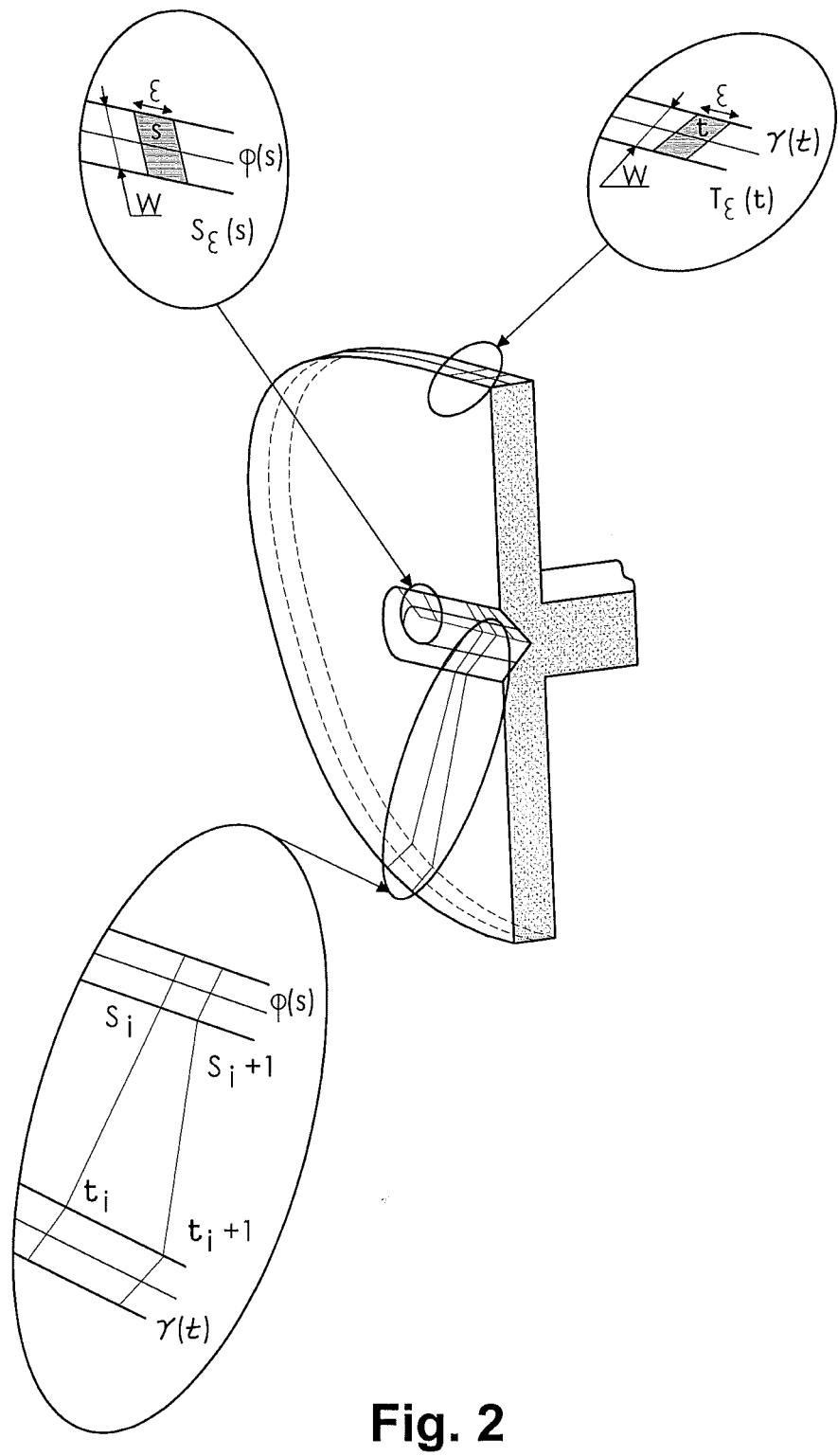
FIG. 2 represents a further description introducing the mathematical background of the directional optical elements of FIG. 1.

The light guide module shown in FIG. 1 is composed of light sources 1 and a light guide 2.

Figure 6:
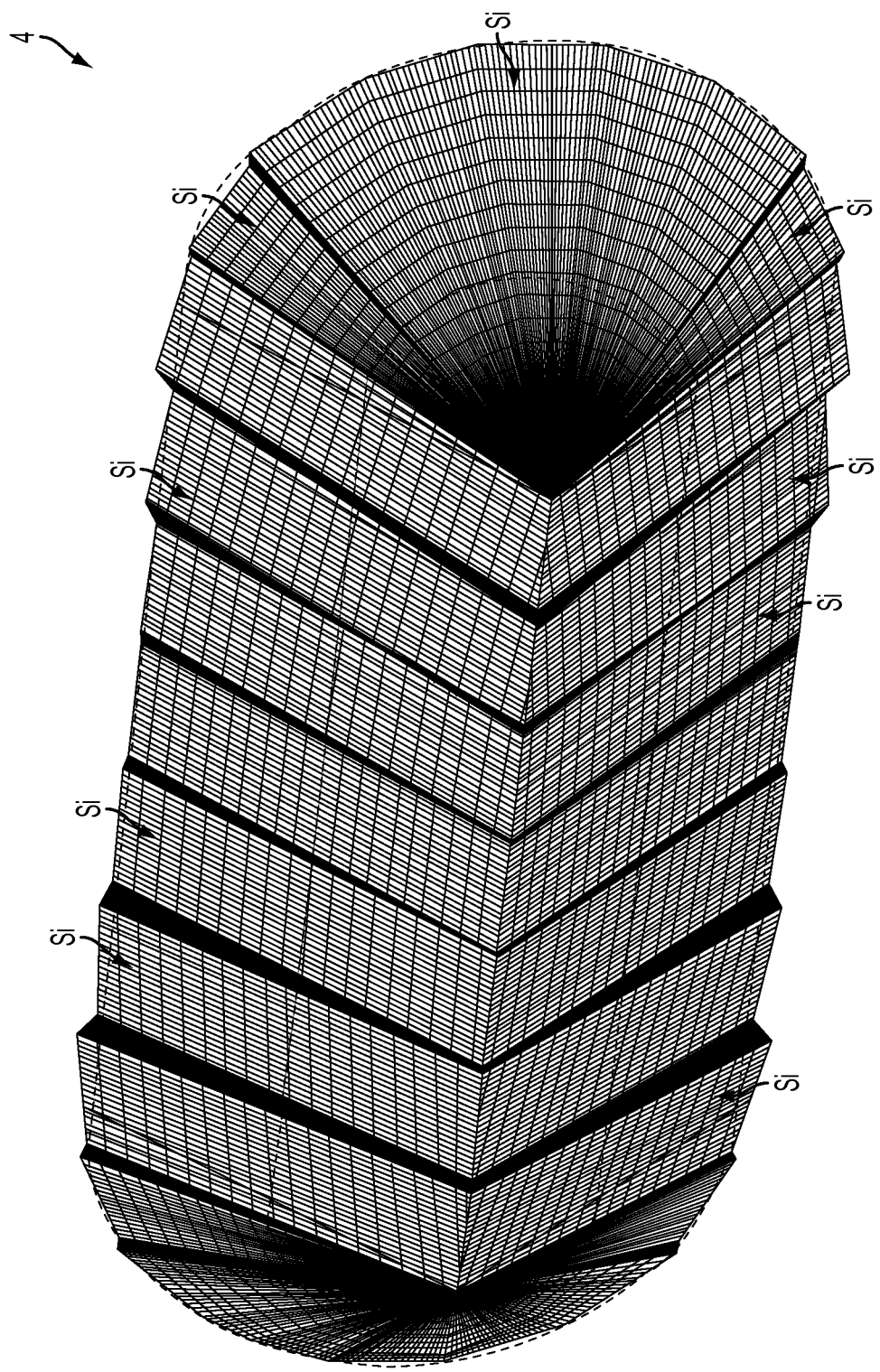
FIG. 6 represents an example of the support surface and directional optical elements shown in FIG. 1.

The light guide 2 is composed of a primary part 3, a Y-shaped branch 4, and a secondary part 5 having a contour surface T. The supporting surface of the Y-shaped branch 4 of the light guide 2, which is made up of a system of directional optical elements Si, is of prismatic shape, conical shape, or a combination thereof (see FIG. 6), and has its vertex on the optical axis 'x' of the primary part 3 of the light guide 2.

The light sources 1 are light-emitting diodes (LEDs) located behind the primary part 3 of the light guide 2. The light-emitting diodes (LEDS) located behind the primary part 3 that terminates in a conically configured Y-shaped branching have a higher luminous flux than the light-emitting diodes (LEDs) located behind the primary part that terminates in a prismatically configured Y-shaped branching.

The first edge 31 of the light guide 2 is provided with a collimating component 32. The component 32 can be constructed as an optical collimator or a Fresnel lens, in order to create a collimated beam of light for loss-free propagation of the light in the light guide 2.

The directional optical elements Si are formed by planar surfaces, cylindrical surfaces, or NURBS surfaces.

In FIG. 3, a light guide module where the contour surface T of the secondary part 5 is linear and the intensities of the light sources 1 are identical is illustrated. In this case, the supporting surface of the Y-shaped branch 4 of the light guide 2 is a surface in the shape of a prism with an inclination of 45° to the optical axis of the primary part 3.

The contour surface T of the secondary part 5 can be oriented in any manner with respect to the optical axis of the primary part 3. FIG. 4 shows a modification of the contour surface T, which makes it possible to orient the emerging light in the direction of the optical axis of the primary part 3.

Another application of the light guide module is an optical system where the contour surface T serves as a light source for another part of a more complex optical system. FIG. 5 shows an example of an optical system containing a light guide module and a parabolic or elliptical reflector 6 with focus F approximately in the middle of the contour surface T.

The advantage of the light guide module is high efficiency, since LEDs are used as the light sources 1 and the light propagates in the light guide 2 without losses. The light guide module, moreover, has minimal space requirements, and, because it has only a small rigid board with printed circuits, it reduces costs.

FIG. 1 illustrates a supporting surface 40, a supporting surface of prismatic shape 42, a supporting surface of conical shape 44, a first portion of the supporting surface 46, a second portion of the supporting surface 48, a first portion of the primary part 50, a second portion of the primary part 52, a first set of directional optical elements 54, and a second set of directional optical elements 56.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. A light guide module with adjustable lighting of a contour surface comprising:
    at least one light source; and
    a light guide in optical communication with the light source, the light guide having a primary part having an optical axis, a secondary part having a curved contoured surface configured to emit light, and a Y-shaped branch disposed between the primary part and the secondary part, the Y-shaped branch having a supporting surface and a vertex, the supporting surface defined by a channel in the rear surface of the secondary part;
    wherein the supporting surface includes a plurality of individual directional optical elements disposed thereon and the vertex is disposed on the optical axis of the primary part, and each individual directional optical element is configured to redirect light from the at least one light source to the contoured surface;
    wherein the channel is an elongated channel having a first rounded end, a second rounded end, a straight portion extending therebetween, and wherein the first and second rounded ends each comprise directional optical elements having a conical shape, and the straight portion comprises directional optical elements having a planar shape, the channel including a planar shape having a first linear edge surface and a second linear edge surface.

2. The light guide module according to claim 1, wherein the supporting surface is of prismatic shape.

3. The light guide module according to claim 1, wherein the supporting surface is of conical shape.

4. The light guide module according to claim 1, wherein the at least one light source comprises a plurality of light-emitting diodes (LEDs) disposed adjacent the primary part to emit light therethrough.

5. The light guide module according to claim 4, wherein a first LED of the plurality of LEDs is disposed adjacent a first portion of the primary part which extends from the supporting surface to direct light from the first LED to the directional optical elements having a conical shape, and a second LED of the plurality of LEDs is disposed adjacent a second portion of the primary part which extends from the supporting surface to direct light from the second LED to the directional optical elements having a prismatic shape, wherein the first LED has a higher luminous flux than the second LED.

6. The light guide module according to claim 1, wherein the light guide has a first edge having a collimating component.

7. The light guide module according to claim 1, wherein a first set of the directional optical elements of the plurality of individual directional optical elements comprises planar surfaces, and a second set of the directional optical elements of the plurality of individual directional optical elements comprises cylindrical surfaces.

8. The light guide module according to claim 1, wherein the secondary part includes a contour surface that is linear.

9. The light guide module according to claim 8, wherein the supporting surface is in the shape of a prism with an inclination of about 45 degrees relative to the optical axis.

10. The light guide module according to claim 1, wherein the contoured surface is oriented at an acute angle or an obtuse angle with respect to the optical axis, and wherein the supporting surface is non-circular about the optical axis.

11. A light guide module with adjustable lighting of a contour surface, the light guide module comprising:
a plurality of light sources, wherein the light sources are light-emitting diodes; and
a light guide in optical communication with the plurality of light sources, the light guide having a primary part having an optical axis, a secondary part having a contour surface, and a Y-shaped branch disposed between the primary part and the secondary part, the Y-shaped branch having a supporting surface and a vertex, the supporting surface defined by a channel formed in a rear surface of the secondary part;
wherein the light-emitting diodes are disposed adjacent the primary part;
wherein the supporting surface includes a system of directional optical elements and the vertex is disposed on the optical axis of the primary part; and
wherein the channel is an elongated channel having a first rounded end, a second rounded end, and straight portion extending therebetween, and wherein the first and second rounded ends each comprise directional optical elements having a conical shape, and the straight portion comprises directional optical elements having a planar shape, the channel including a planar shape having a first linear edge surface and a second linear edge surface.

12. The light guide module according to claim 11, wherein a first light-emitting diode is disposed adjacent the primary part terminating in the supporting surface having the conical shape and a second light-emitting diode is disposed adjacent the primary part terminating in the supporting surface having the prismatic shape, the first light-emitting diode configured to generate a higher luminous flux than the second light-emitting diode.

13. The light guide module according to claim 11, wherein the light guide has a first edge with a collimating component.

14. The light guide module according to claim 13, wherein the collimating component is one of an optical collimator and a Fresnel lens.

15. The light guide module according to claim 11, wherein the optical elements are formed by one of a planar surface, a cylindrical surface, and a non-uniform rational base spline surface.

16. A light guide module with adjustable lighting of a contour surface, the light guide module comprising:
a plurality of light sources, wherein the light sources are light-emitting diodes; and
a light guide in optical communication with the plurality of light sources, the light guide having a primary part having an optical axis, a secondary part having a contour surface that is linear, and a Y-shaped branch disposed between the primary part and the secondary part, the Y-shaped branch having a supporting surface and a vertex, the supporting surface defined by a channel in the rear surface of the secondary part;
wherein a first portion of the supporting surface is a prismatic shape and a second portion of the supporting surface is a conical shape;
a first light-emitting diode being disposed adjacent a portion of the primary part extending from the supporting surface having the conical shape, and a second light-emitting diode being disposed adjacent a portion of the primary part extending from the supporting surface having the prismatic shape, the first light-emitting diode configured to produce a higher luminous flux than the second light-emitting diode;
a plurality of individual directional optical elements coupled to the support surface, and the vertex is disposed on an optical axis of the primary part,
wherein the channel is an elongated channel having a first rounded end, a second rounded end, and straight portion extending therebetween, and wherein the first and second rounded ends each comprise directional optical elements having a conical shape, and the straight portion comprises directional optical elements having a planar shape, the channel including a planar shape having a first linear edge surface and a second linear edge surface.

17. The light guide module according to claim 16, wherein the primary part is rectangular.

* * * * *